July 10, 1945.        J. C. SHAW ET AL        2,379,995
DRAIN VALVE
Filed Oct. 25, 1943
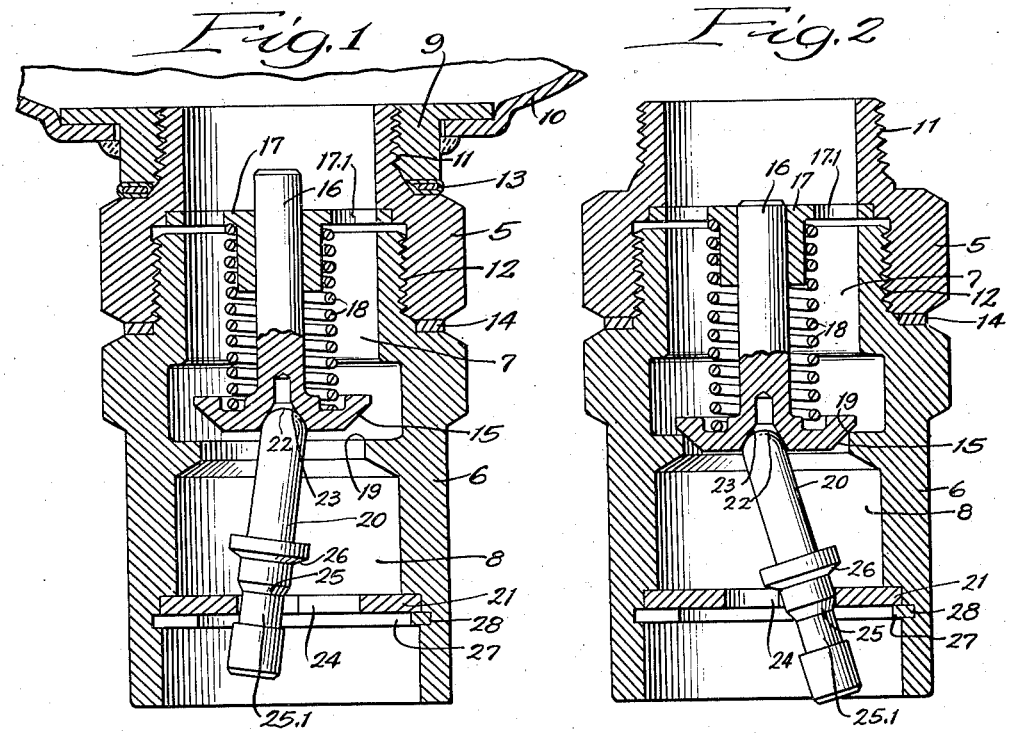
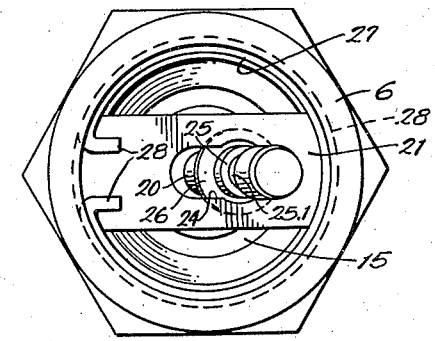
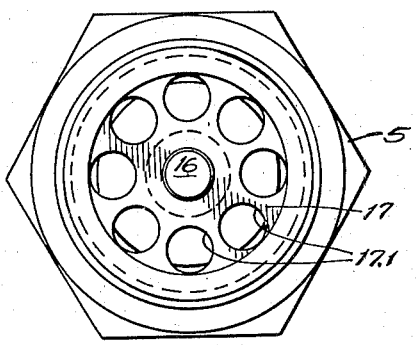
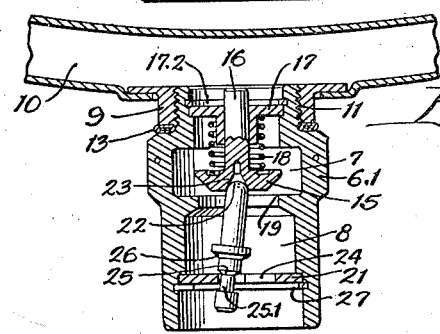
Inventors:
Joe C. Shaw and
Earl H. Kidd,
By Evans, Pond & Henderson
Attorneys.

Patented July 10, 1945

2,379,995

UNITED STATES PATENT OFFICE 2,379,995

DRAIN VALVE

Joe C. Shaw and Earl H. Kidd, Racine, Wis., assignors to Young Radiator Company, a corporation of Wisconsin Application October 25, 1943, Serial No. 507,544

4 Claims. (Cl. 137—34)

The main objects of this invention are to provide an improved valve mechanism for the drain openings of fluid containers; to provide a valve drain mechanism of this kind having improved means for retracting and retaining open the normally closed valve member; to provide an improved valve mechanism of this kind of such simple construction that it may be economically manufactured and be marketed as a unit suitable for attachment to almost any type of container; and to provide an improved valve mechanism of this kind particularly suitable for use with aircraft oil coolers.

In the particular embodiments of the invention shown in the drawing:

Fig. 1 is a cross sectional view showing the improved valve mechanism attached to a drain opening, the valve being in its open or retracted position;

Fig. 2 is a similar view showing the valve in its closed position;

Fig. 3 is a lower end view of Fig. 1;

Fig. 4 is an upper end view of Fig. 2; and

Fig. 5 is a view similar to Fig. 1, but showing a modified form of valve housing.

In an improved drain valve of this type the housing may be formed of the two parts 5 and 6 as shown in Figs. 1 and 2, or as a single piece 6.1 as shown in Fig. 5. Within the housing is mounted a valve mechanism 7 and in connection with which is arranged a shifting and retaining means 8. The structure is suited for attachment to a fitting 9 through which the contents of a fluid container 10 are to be drained.

In the two-part housing the parts 5 and 6 are shown respectively in the form of a bushing or an adapter and a nipple. As a bushing the part 5 would be provided with an external thread 11 whereby it may be screwed into the threaded fitting 9. As an adapter it could be provided with a plate for bolting the housing onto the fitting 9. The internal thread 12 on the bushing 5 receives the complementary thread on the nipple part 6. Gaskets 13 and 14 are interposed between the bushing 5 and the fitting 9 and between the parts 5 and 6 respectively to insure a positive sealing between these several parts.

When the housing is a single piece 6.1 the end may be threaded as shown or may have a flange formed thereon as suggested above.

The valve mechanism 7 includes a valve member 15 carried on a stem 16 slidably supported on a hubbed plate 17 and urged by a spring 18 into engagement with a valve seat 19 formed in the housing part 6.

The valve-supporting plate 17 is suitably secured within the housing. This plate is provided with a series of apertures 17.1 which allow for communication through the valve housing. In the two part housing the plate is secured directly above the threaded end of the nipple part 6. In the single piece housing the plate is held in place by a snap ring 17.2 similar to that hereinafter described in connection with plate 21.

The valve-retracting and -retaining means 8 includes a stem 20 co-acting with a support strap or plate 21, secured in the lower open end of the housing part 6.

The pin 20 has its upper end rounded at 22 to fit in a recess 23 at the bottom of the valve member 15 to form a ball and socket joint. The pin 20 extends through a keyhole slot 24 in the strap or plate 21 and is provided with spaced shoulders 25 and 26 which coact respectively with the larger and narrower portions of the keyhole slot 24 for securing the pin in either of the two possible positions. The shoulder 25 is formed by recessing the pin at 25.1 to the diameter of the small portion of the keyhole slot 24 in the plate 21. This permits the shoulder 25 to rest against the plate 21 to hold the valve member 15 in its retracted or unseated position as shown in Fig. 1. The shoulder 26 is in the form of a collar of larger diameter than the larger portion of the keyhole slot 24. It is positioned on the pin 20 so that its contact with the plate 21 will allow the valve to completely seat and permit the pin to occupy a "safety position" so as to prevent the pin from being accidentally shifted and cause an unseating of the valve. The safety position of these parts is shown in Fig. 2.

The retaining plate 21 is removably secured within the housing part 6 by means of a snap ring 27, which is seated in a groove 28 formed in the housing part 6. The ends of the snap ring 27 are bent to form shoulders 28 by means of which the ring may be contracted to permit its insertion into or removal from the groove 28.

The use and operation of the device herein shown is quite apparent from the foregoing description. When the several parts are assembled the unit may be attached to the conventional drain outlet, of almost any fluid receptacle, by simply screwing the threaded end 11 into the fitting 9. Normally the pin 20 would be shifted into the larger portion of the keyhole slot 24 as shown in Fig. 2, whereby the spring 18 would seat the valve member 15, thus retaining the contents in the container 10.

When the container is to be drained it is necessary only to push the pin 20 inwardly against the action of the spring 18 thereby unseating the valve. If a small quantity of the liquid is to be drained, the pin 20 may be held with the valve 15 in its retracted position. However, if it is desired to leave the valve 15 in its retracted position for an extended draining operation the pin would be shifted into the narrow part of the keyhole slot 24 as shown in Fig. 1. The parts may be allowed to remain in such position until the draining of the receptacle is completed. When the draining operation is to be ended the pin 20 can again be shifted to the larger portion of the keyhole slot whereupon the valve member 15 would again become seated.

Although two embodiments of this invention have been herein shown and described, it will be understood that details of the construction shown may be altered without departing from the spirit of the invention as defined by the following claims.

We claim:

1. A drain valve mechanism comprising a housing formed of two separable interfitting parts one of which is equipped for attachment to the drain opening of a fluid container and the other of which has a valve seat formed therein, a perforated valve-supporting plate secured in said one housing part, a valve slidably mounted on said supporting-plate and adapted to cooperate with said valve seat for controlling the flow of fluid through said housing, a spring interposed between said valve and said suporting-valve for seating said valve, a valve-shifting pin supported on said other housing part in contact with said valve and shiftable axially and laterally of said housing between positions to effect the seating and unseating of said valve, a pin-supporting plate fixed in said other housing member and having a keyhole slot therein for receiving said pin, and shoulders on said pin adapted to co-act with said plate for retaining said pin in either of its positions.

2. A drain valve mechanism comprising a housing formed of a bushing and an interfitting nipple the former of which is adapted for attachment to the train opening of a receptacle and the latter of which has a valve seat formed therein, a perforated valve-supporting plate secured in said bushing, a valve slidably supported on said supporting-plate and adapted to cooperate with said valve seat for controlling the flow of fluid through said housing, a spring interposed between said plate and valve for normally seating said valve, a pin-supporting plate secured in the open end of said nipple and having a keyhole slot formed therein, a valve-shifting pin extending through said keyhole slot and having a ball and socket connection with said valve and shiftable axially and laterally of said housing, and shoulders on said pin adapted for engagement respectively with the perimeters of the larger and smaller portions of said keyhole slot for limiting the axial movement of said pin and for holding said pin in nonshiftable position when said valve is seated or unseated.

3. A drain valve unit comprising a housing formed at one end for removable insertion in the drain opening of a fluid container, a valve seat formed in said housing intermediate its ends, a perforate plate in one end of said housing, a valve slidably supported on said plate and adapted to cooperate with said valve seat for controlling the flow of fluid through said housing, a spring interposed between said plate and valve for normally holding said valve on said seat, a slotted plate fixed in said housing inwardly of the opposite end thereof, a pin extending through said slot and abutting against said valve and movable axially and laterally of said housing between positions for seating and unseating said valve, and coacting shoulders on said pin spaced apart axially thereof and separately engageable with the plate perimeter of said slot on the inner face of said plate for holding said pin in either of its respective positions.

4. A drain valve unit comprising a housing formed at one end for removable insertion in the drain opening of a fluid container, a valve seat formed in said housing intermediate its ends, a perforate plate in one end of said housing, a valve slidably supported on said plate and adapted to cooperate with said valve seat for controlling the flow of fluid through said housing, a spring interposed between said plate and valve for normally holding said valve on said seat, a keyhole slotted plate fixed in said housing inwardly of the opposite end thereof a distance equal to the intended movement of said valve, a pin extending through said keyhole slot and abutting against said valve and movable axially and laterally of said housing between positions for seating and unseating said valve, and coacting shoulders on said pin engageable with the plate perimeter of the opposite portions of said keyhole slot for holding said pin in its respective positions, the axial spacing of said shoulders on said pin being such that the end of the pin never protrudes beyond the extremity of said housing.

JOE C. SHAW.
EARL H. KIDD.